United States Patent [19]

Patterson

[11] Patent Number: 4,783,272

[45] Date of Patent: Nov. 8, 1988

[54] REMOVING SOLIDS FROM PROCESS SEPARATOR VESSELS

[75] Inventor: John C. Patterson, Plano, Tex.

[73] Assignee: Atlantic Richfield Company, Los Angeles, Calif.

[21] Appl. No.: 90,715

[22] Filed: Aug. 28, 1987

[51] Int. Cl.$^4$ .................... B01D 21/00; B01D 17/038
[52] U.S. Cl. .................... 210/787; 210/801;
210/803; 210/804; 210/805; 210/806;
210/195.4; 210/196; 210/197; 210/512.2;
210/522; 210/532.1; 210/538
[58] Field of Search .............. 210/788, 787, 800, 801, 210/803, 804, 805, 806, 194, 195.1, 195.3, 195.4, 196, 197, 304, 512.1, 512.2, 521, 522, 532, 533, 536, 537, 538, 540; 209/217, 144

[56] References Cited

U.S. PATENT DOCUMENTS 4,519,848 5/1985 Underwood .................... 210/788

*Primary Examiner*—Frank Sever
*Attorney, Agent, or Firm*—Michael E. Martin

[57] ABSTRACT

Sediments collecting in process separator vessels for oil and gas flowstreams are evacuated by an apparatus which is connected to the separator vessel for circulating a slurry of separated liquid in said vessel and entrained solids fines out of said vessel, and separating the solids from the liquid and returning the liquid to the separator vessel. The apparatus includes a motor driven pump connected to cyclone separators and a variable speed motor control which maintains a substantially constant pressure of the solids free liquid returning to the separator vessel so that a substantially constant flow of liquid is supplied to a jet manifold in the separator vessel irrespective of changes in fluid density of the solids laden flowstream being discharged from the vessel.

10 Claims, 1 Drawing Sheet

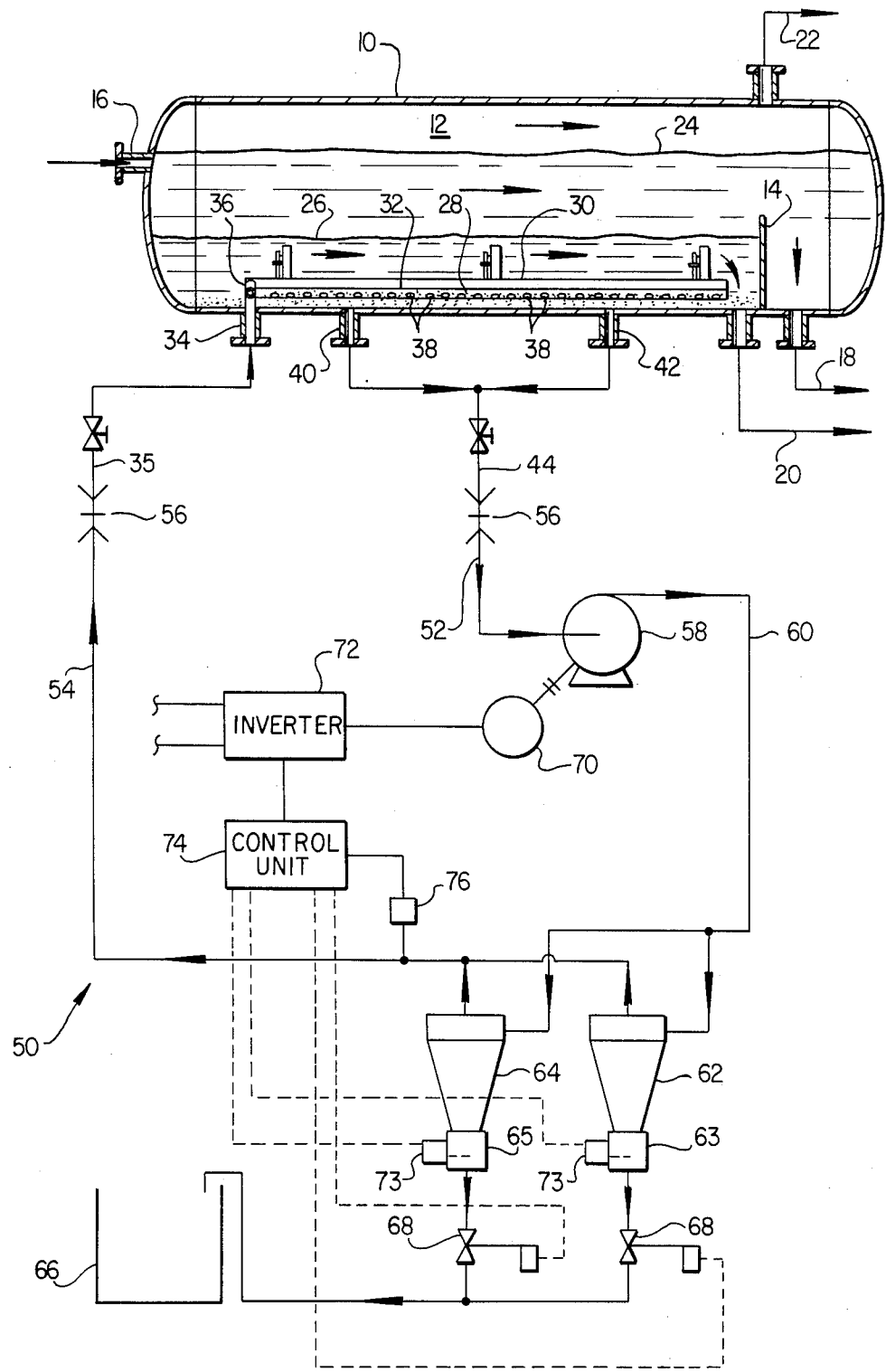

REMOVING SOLIDS FROM PROCESS SEPARATOR VESSELS

BACKGROUND OF THE INVENTION

1. Field of the Invention

The present invention pertains to an apparatus for removing accumulations of sand and similar sediments from process separator vessels by circulating vessel liquid through a pump and cyclone type separator and returning the liquid to the vessel.

2. Background

Certain fluid separation processes result also in the separation of solids which tend to accumulate in the process separator vessels. For example, in the production of crude oil and natural gas from subterranean wells the production stream is subjected to a separation process by passing the stream into and through a separator vessel wherein water and other more dense liquids are separated from the crude oil and/or gas. Crude oil production streams often contain large amounts of relatively fine sediments or sand which accumulate in the primary separator vessels and must be removed from time to time.

Typical separator vessels include a weir or dam for holding back the separated water or other more dense liquid from remixing with the separated crude oil, both streams being passed out of the vessel at a controlled rate so as to maintain liquid levels in the vessel to effect continuous operation of the process. Any disturbance of the process such as due to the injection of a cleanout liquid tends to unbalance the process flow rates and require frequent adjustment of the flow rates of the stream flowing into the vessel as well as the separated fluid streams leaving the vessel. This type of vessel cleanout process is difficult to manage and the equipment requirements for handling the evacuation of liquid as well as the quantity of liquid which inevitably accompanies the outflow of sediments must be substantial. Still further problems associated with the conventional solids removal systems pertains to the handling of the evacuated solids. Typically, the evacuation liquid with entrained solids leaving the process vessel is transferred to a separate separator vessel to allow the solids to settle and the liquid is then decanted and transferred back to the system or otherwise treated separately for disposal. However, environmental restrictions often limit the choices for disposal of the solids evacuation liquid. Accordingly, there has been a substantial need for improvements in systems for evacuating solids such as sand and similar sediments which accumulate in oil and gas separator vessels, in particular.

SUMMARY OF THE INVENTION

The present invention provides an improved method and apparatus for evacuating accumulations of sand and other sediments in process separator vessels, in particular, produced oil and gas separator vessels.

In accordance with an important aspect of the present invention an apparatus is provided which may be connected to a process separator vessel for evacuating accumulations of fine solids, such as sand, utilizing the vessel liquid which is circulated from the vessel with sand entrained therein and is recirculated back to the vessel after separation of the entrained solids. By utilizing one of the process liquids which is present in the separator vessel a net change in the quantity of liquid flowing through the vessel due to the cleanout process is eliminated and control of the overall process does not have to be adjusted during the cleanout operation.

In accordance with another important aspect of the present invention, a separator vessel cleanout or sand evacuation system is provided which utilizes relatively high volume separator apparatus such as cyclone type separators in circuit with a pump wherein solids laden process liquid is removed from the separator vessel by the pump, circulated through the cyclone separators and solids free liquid is returned to the vessel on a substantially continuous basis to minimize changes in flow rates through the process vessel itself. The solids evacuation system preferably utilizes a motor driven pump which is controlled by control means which senses the discharge pressure of the solids free liquid being returned to the process vessel and maintains a substantially constant pressure to compensate for changes in fluid density as the solids evacuation process progresses. In this way, a more efficient evacuation process is carried out in that a desired jet or nozzle discharge velocity of the evacuation fluid is maintained throughout the solids evacuation cycle.

In a preferred embodiment of the system an a.c. electric motor driven centrifugal pump is controlled by an inverter wherein the speed of the pump is varied directly by varying the speed of the electric motor. The control means may be also configured to periodically change the motor speed to generate a rapid change in flow rate or pulse type flow characteristic to enhance the solids evacuation process.

The abovenoted features and advantages of the present invention together with other superior aspects thereof will be further appreciated by those skilled in the art upon reading the detailed description which follows.

BRIEF DESCRIPTION OF THE DRAWING

The drawing FIGURE is a schematic diagram of a process vessel evacuation apparatus in accordance with the present invention.

DESCRIPTION OF PREFERRED EMBODIMENTS

In the description which follows like parts are marked throughout the specification and drawing with the same reference numerals, respectively. The drawing FIGURE is not to scale and certain features and elements are shown in schematic form utilizing conventional graphic symbols in the interest of clarity and conciseness.

Referring to the drawing FIGURE, there is illustrated part of a crude oil separation process system including a process separator vessel 10 having an interior space 12 and a transverse weir 14 disposed for controlling the flow and separation of fluids entering the space 12. The process vessel 10 includes a fluid inlet conduit 16 and outlet conduits 18 and 20 for conducting separated liquids such as oil and water, respectively, from the interior of the vessel. A gas outlet conduit 22 is also provided for removing gas separated from the liquids within the space 12.

Typical liquid levels within the process vessel 10 during steady state operation are indicated by the oil level or surface 24 and the oil-water interface 26. As a normal part of the operation of the vessel 10 in providing separation of crude oil from entrained water and gas, a flow stream of a crude oil and water mixture enters the vessel through the inlet 16 and is retained in residence sufficiently to allow separation of the oil from water and wherein these liquids are separately conducted from the vessel by way of the conduits 18 and 20. As a consequence of the separation process entrained solid fines such as sand and other sediments accumulate at the bottom of the vessel as indicated by the accumulation of sand 28. The sand 28 must be periodically removed from the vessel 10 and such may be carried out by an improved cleanout system of a type which is described in my copending patent application Ser. No. 07/090,814 entitled: Liquid Jet Solids Removal System For Process Vessels, filed of even date herewith and assigned to the assignee of the present invention. The sand cleanout system comprises a plurality of elongated manifolds 30 and 32, each of which is adapted to receive a flow of liquid from an inlet conduit 34-35 by way of a connecting manifold 36. A plurality of jet nozzles 38 are formed in the manifolds 30 and 32, as indicated for the manifold 32, and are oriented so as to provide for ejecting a high velocity stream of liquid to agitate and force the flow of a liquid-sand mixture towards outlet conduits 40 and 42 which are connected to a common discharge flow conduit 44. By circulating liquid through the manifolds 30 and 32, from time to time, the accumulation of sand 28 may be kept at a minimum so as to not interrupt the process flow conditions in the vessel 10.

In accordance with the present invention the process flow conditions, that is the inflow of liquid to the inlet 16 and the outflow of liquids through the conduits 18 and 20 are not disturbed during the evacuation of sand 28 from the vessel 10 thanks to the apparatus illustrated in schematic form and generally designated by the numeral 50. The apparatus 50 includes conduits 52 and 54 for connection to the conduits 44 and 35, respectively, preferably by way of quick disconnect couplings 56. The conduit 52 is adapted to receive sand laden liquid from the vessel 10 and the conduit 54 is adapted to return substantially solids free liquid to the vessel. The conduit 52 is connected to a motor driven, variable speed, centrifugal pump 58 of a type which is particularly adapted for handling slurrylike liquids. The pump 58 is connected to a discharge conduit 60 which leads to liquid-solids separator units 62 and 64 which are of a type commercially available and are basically a cyclone or centrifugal type separator wherein solids fines are separated from the entraining liquid and are allowed to accumulate in reservoir portions 63 and 65 of the separators, respectively. A substantially thickened slurry of solids and small amounts of liquid may be periodically dumped from the reservoir portions 63 and 65 into a solids holding tank 66 by way of suitable motor operated dump valves 68 connected to the separators 63 and 64. Substantially solids free liquid is returned to the vessel 10 by way of the conduit 54 which is connected to each of the separators 62 and 64 as illustrated.

The pump 58 is preferably driven by an a.c. electric motor 70 which is connected to a suitable source of electric power, not shown, by way of an inverter 72. The inverter 72 is controlled by a suitable control unit 74 which is adapted to sense the pressure in the conduit 54, by way of a pressure sensor 76, and to adjust the speed of the motor 70 and the pump 58 through the inverter 72 to maintain a substantially constant discharge pressure of liquid being conducted to the manifolds 30 and 32. In this way the velocity of the evacuation fluid being utilized to entrain and evacuate the accumulation of sand 28 in the vessel 10 is not affected by change in the density of the slurry-like fluid that is being discharged from the pump 58. In other words, by locating the pressure sensor 76 downstream of the separators 62 and 64 a substantially constant fluid pressure may be maintained for the evacuation fluid flowing to the manifolds 30 and 32 regardless of changes in density of the solids laden fluid being conducted to and through the pump 58 and on to the separators 62 and 64. Moreover, the control unit 74 may be adapted to selectively vary the pump speed by controlling the inverter 72 and the motor 70 at will be introduce a surge or "pulse" of fluid flow into and through the manifolds 30 and 32 to enhance the solids evacuation process. The control unit 74 is also adapted to operate the dump valves 68 to remove accumulated solids in the reservoir portions 63 and 65 and to discharge these solids to the tank 66. For example, the reservoir portions 63 and 65 are each preferably provided with solids level detectors 73 such as a type sold under the trademark KASITROL by ASI Keystone, Inc., Houston, Tex. The level detectors 73 are operably associated with the control unit 74 to effect operation of the valves 68. Solids may be removed from the tank 66 also, at will, by suitable means, not shown.

Thanks to the vessel cleanout system 50 which utilizes separated liquid, such as water, disposed in the vessel 10 below the interface 26 for evacuating the sand 28 from the vessel interior and recirculating the water back to the vessel interior chamber 12 continuously, there is essentially no adverse effect on the process flow conditions due to the removal of accumulations of solids from within the vessel. Accordingly, the vessel 10 may be cleaned while operating without requirements to change the process flow conditions of fluid being admitted to the vessel or conducted from the vessel by way of the conduits 16, 18 and 20, respectively. Moreover, by mounting the apparatus 50 on a portable sled or skid, not shown, it may be moved from one vessel to the other and connected thereto by way of the couplings 56 so that only one system may be required to service a substantial numbe of process vessels.

The components of the system 50 are to a large extent commercially available. For example, the pump 58 may be of a centrifugal slurry type such as a type DAH manufactured by Warman International, Inc., Madison, Wis. The separators 62 and 64 may be of a type R-AX cyclone separator manufactured under the trademark LAKOS by Claude Laval Corporation, Fresno, Calif. The pressure transmitter 76 may be of a type which converts a mechanical pressure signal to an electrical signal which is treated by the control unit to cause the inverter to vary its output frequency for controlling the speed of the motor 70 so as to maintain the pressure in the conduit 54 substantially constant.

The control unit 74 may be fitted with suitable circuitry and a timing mechanism for periodically opening the valves 68 momentarily to empty accumulated solids from the cyclone separators 62 and 64 instead of or in addition to operation of the valves 68 in response to signals from the level detectors 73. The control unit 74 may also be configured to be operable to selectively vary the output frequency of the inverter 72 to control motor speed to effect pulse type changes in flow to the manifolds 30 and 32 and to adjust pump discharge pressure to maintain a predetermined differential between the vessel operating pressure in the space 12 and the pressure in the manifolds. Other components illustrated may be of types commercially available and known to those skilled in the art. Conventional engineering materials for process equipment may be utilized in fabricating the apparatus 50.

Although it is believed that a preferred embodiment of the invention has been described herein in detail sufficient to enable those skilled in the art to practice the invention, it will be recognized that various substitutions and modifications may be made to the specific, steps, components and configuration shown without departing from the scope and spirit of the invention as recited in the appended claims.

What I claim is:

1. A method for evacuating accumulated solids comprising: providing a process separator vessel of a type which is adapted to receive a flowstream of liquid with entrained solids for separating oil from water and other liquids more dense than said oil and without substantially changing the flow rate of liquid through said vessel and wherein said vessel includes means for controlling the level of liquid in said vessel, means for accumulating said solids along a bottom portion of said vessel and in a region occupied by said more dense liquid and means for circulating liquid through said region to entrain said solids for evacuation from said vessel, a vessel inlet conduit for conductng liquid to said means for circulating and a vessel outlet conduit for discharging a mixture of liquid from said region with solids entrained therein, providing solids separator means including motor driven pump means, first conduit means for connection to said vessel outlet conduit, a separator unit, a pump discharge conduit connected to said separator unit for conducting said mixture to said separator unit for separating solids from said mixture and second conduit means connected to said separator unit for returning solids free liquid to said vessel inlet conduit;

connecting said first and second conduit means to said vessel outlet conduit and said vessel inlet conduit, respectively;

operating said pump means to circulate liquid from said region through said separator means and back to said means for circulating wherein the liquid in said region is utilized to entrain solids accumulated along said bottom portion of said vessel, remove said solids from said vessel and return liquid substantially free of solids to said vessel while substantially maintaining constant liquid level in said vessel during evacuation of said solids.

2. The method set forth in claim 1, including the step: operating said pump means to maintain a substantially constant pressure in said vessel inlet conduit to maintain the flow of liquid through said means for circulating at a substantially constant rate.

3. The method set forth in claim 2, wherein: the step of operating said pump means to maintain a constant pressure is carried out by varying the speed of said motor driving said pump means.

4. The method set forth in claim 1, including the step of:

periodically operating said pump means to vary the pressure of liquid conducted to said means for circulating to agitate accumulated solids in said vessel.

5. The method set forth in claim 1, including the step of:

introducing a flowstream of water and oil into said separator vessel while operating said pump means and continuously separating water from oil while evacuating solids laden water from said vessel.

6. The method set forth in claim 1 including the step of:

maintaining a predetermined differential pressure between the pressure in said vessel and said means for circulating liquid.

7. In a system for separating solids from a liquid flowstream the combination comprising:

a process separator vessel including a flowstream inlet conduit, a liquid discharge conduit and means for controlling the level of liquid in said separator vessel, said separator vessel including a bottom portion including means disposed along said bottom portion for circulating liquid to entrain solids accumulated in said vessel along said bottom portion, an outlet conduit for conducting a slurry of liquid and entrained solids from said separator vessel and an inlet conduit for conducting substantially solids free liquid to said means for circulating;

a pump including a pump inlet conduit and means for connecting said pump inlet conduit to said outlet conduit for conducting said slurry from said separator vessel;

motor means for driving said pump;

a separator unit connected to said pump for receiving a flowstream of said slurry from said separator vessel and for separating a substantial portion of the solids in said slurry from the liquid of said slurry;

a liquid return conduit connected to said separator unit and means for connecting said liquid return conduit to said inlet conduit for conducting substantially solids free liquid from said separator unit to said means for circulating; and means for controlling the flow of liquid through said pump and said separator unit for evacuating solids from said separator vessel and for maintaining a substantially constant level of liquid in said separator vessel during the evacuation of solids from said separator vessel.

8. The system set forth in claim 7, wherein:

said means for controlling the flow of liquid includes pressure sensing means for sensing the fluid pressure in said liquid return conduit and control means for controlling said pump to maintain a substantially constant pressure in said liquid return conduit.

9. The system set forth in claim 8 wherein:

said motor is an AC electric motor and said control means includes an inverter for varying the frequency of electrical current to said motor to control the speed of said pump to maintain the pressure in said liquid return conduit substantially constant.

10. The system set forth in claim 7 wherein:

said separator unit includes means for collecting solids separated from said slurry and valve means for discharging a thickened slurry of solids and a small amount of liquid from said separator unit.

* * * * *